METHOD AND APPARATUS FOR SORTING SEMI-CONDUCTOR DEVICES

Filed Sept. 5, 1967 3 Sheets-Sheet 1

INVENTORS
ROBERT E. HUNT
MORDECHAI WIESLER
AVIGDOR GOREN
BY Moss, Altman & Oates
ATTORNEYS INVENTORS
ROBERT E. HUNT
MORDECHAI WIESLER
AVIGDOR GOREN
BY Moore, Atterbury & Oates
ATTORNEYS INVENTORS
ROBERT E. HUNT
MORDECHAI WIESLER
AVIGDOR GOREN
BY Morse, Altman + Oates
ATTORNEYS 3,497,948
METHOD AND APPARATUS FOR SORTING SEMI-CONDUCTOR DEVICES

Mordechai Wiesler, Lexington, Avigdor Goren, Lynnfield, and Robert E. Hunt, Andover, Mass., assignors, by direct and mesne assignments to Transistor Automation Corporation, Cambridge, Mass., a corporation of Massachusetts.

Filed Sept. 5, 1967, Ser. No. 665,635
Int. Cl. B01j *17/00;* H01l *7/66*
U.S. Cl. 29—583 11 Claims

ABSTRACT OF THE DISCLOSURE

A wafer of an array of apparently identical semi-conductor devices in practice include grades of quality within a given wafer. The individual devices are physically sorted into separate categories or grades from the slice by mounting the slice, after it has been scored in a grid pattern, onto a pressure sensitive adhesive tape, pressing the wafer and the tape against a release surface of a resilient character and then running a tool of a small radius against the back surface of the tape and wafer in both score directions causing the individual elements to separate from the wafer. The tape with the individual disconnected semi-conductor devices adhering to the tape surface are separated from the release surface and then passed through a radii translation process. This process involves advancing the tape with the adhering semi-conductor elements over a straight edge having a small radius which causes each row of devices to be elevated with respect to the sides of the leading and trailing rows and in position to be grabbed by the jaws of an electro-mechanical tweezer which picks off each device from the tape and transfers it to a predetermined group of other devices of the same grade. Operation of the sorting mechanism is under the control of automatic positioning units which in turn is controlled by recorded quality control data obtained by prior tests carried out on the individual wafer being sorted. A self-packaging system is provided for packaging each individual element sorted.

BACKGROUND OF THE INVENTION

Field of the invention

This invention relates generally to sorting methods and apparatus and more particularly is directed to a new and improved method and associated apparatus for sorting semi-conductor devices of the type fabricated in an array on an initially rigid wafer.

Description of the prior art

The most common method of producing semi-conductor devices is on thin silicon wafers or slices by the process of oxidation, photo-resist processing, etching, impurity diffusion and metal evaporation. Because of the complications involved, control of the process is relatively poor even at the present stage of development, and a uniform product within narrowly specified limits is not often obtained. To compensate for this semi-conductor devices, particularly transistors, are produced by family starts wherein a number of types will be produced on a given slice from one prime start. The types produced from the prime start vary as to electrical parameters, the prime start being the type which has either the greatest selling price or the greatest marketability while the lesser fallout types are generally marketed at lower prices. A number of family starts on the slice may vary from 3 to 10, the average being approximately 6.

Manufacturers have long attempted to sort the devices into categories from the slice so as to minimize labor content in assembly areas. This is theoretically possible if each die is generally electrically tested while still part of the slice. It is possible, for instance, to color code devices by inking them during the testing operation. In fact some manufacturers do perform this operation and sort devices into categories manually. The price of this operation, however, precludes its utilization on anything other than very expensive types. Various techniques have been tried for sorting the individual devices from a single wafer into particular categories. However, heretofore there has been no satisfactory method or apparatus for sorting semi-conductor devices on an automatic basis. It is therefore an object of this invention to provide a new and improved method and associated apparatus for quickly, easily, and with a high degree of accuracy sorting the semi-conductor devices in a wafer of devices into physically separate graded groups.

SUMMARY OF THE INVENTION

This invention features a method of sorting semi-condutor devices from a wafer including the steps of mounting the wafer on a pressure sensitive adhesive tape, mounting the tape to a cushioned relief surface, passing a rigid tool having a relatively small radius against the back surface of the tape causing a previously scored wafer to crack along the score lines, thus separating the semi-conductor devices from one another while still adhering to the tape. The tape is then carried over a fixed abutment having a straight edge of small radii whereby each row of devices is raised up in relation to adjacent rows to permit individual elements to be picked up and deposited in a selected location according to the particular characteristic of the device.

The apparatus for sorting the devices includes a fixed rest having a straight edge of narrow radii over which the tape is mounted with the wafer side extending outwardly. Carrier means are provided to engage the tape and pull it down on opposite sides of the rest with the wafer extending over the edge, and advancing the tape incrementally on signal to bring successive rows of devices into position along the edge. An electro-mechanical pickup transfers each element from the tape to a selected location and includs a tweezer adapted to index into position to engage each selected device and transfer the device to the selected group. Various control means are provided for indexing the carrier and the transfer element. A plurality of belts are located in proximity to the rest and the transfer mechanism, each belt being adapted to receive semi-conductor devices of a particular predetermined classification. The belts are formed with pockets and a backing surface is applied for packaging the components on an automatic basis.

DESCRIPTION OF THE PREFERRED EMBODIMENT

Figure 1:
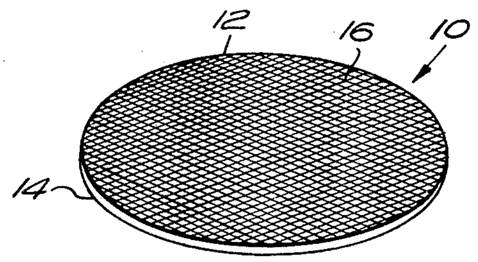
FIG. 1 is a view in perspective of a typical wafer of semi-conductor devices which have been scored in a grid pattern.

Referring now to the drawings and to FIG. 1 in particular, there is illustrated a monolithic wafer 10 typically a thin and rather brittle silicon crystal slice on which a number of microscopic circuits or circuit components have been formed by well known techniques. A wafer of this type typically is on the order of an inch or so in diameter and may comprise hundreds of individual semiconductor devices. While each device in the wafer should be identical one with another in appearance and operation, in practice the wafer may consist of perhaps 5 to 10 different grades of devices because of various complications involved in the production of the wafer and the devices. In any event, all of the devices which make up the wafer do not have the same electrical characteristics and the devices in the wafer must be sorted out in accordance with their characteristics before they can be put to practical use.

In accordance with this invention the wafer is first scored in a grid pattern forming score lines 12 and 14 at right angles to one another across the wafer surface and along the boundaries between adjacent semi-conductor devices or dies 16 which may be several thousand in number for a given wafer depending upon the size of a particular die and the size of the wafer. In any event, the wafer is then mounted against a pressure sensitive adhesive tape 18 with the scored surface facing outwardly. In practice, best results have been found in using a film of transparent tape such as sold under the trademark "Mylar" by Du Pont with a low tack adhesive such as sold under the trademark "Paclon" #682 manufactured by Minnesota Mining & Manufacturing Co. The backing film may be on the order of .001 inch thick with the adhesive stratum being on the order of .0015 inch thick. The wafer itself will on the average be .005 inch thick and each die may be perhaps .015 inch square although the dimensions of all of the above are not critical and may vary according to materials used and the particular circuit manufactured.

Figure 2:
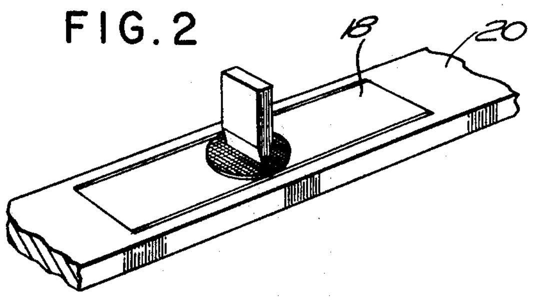
FIG. 2 is a view in perspective illustrating the technique for breaking the wafer into individual components.
Figure 3:
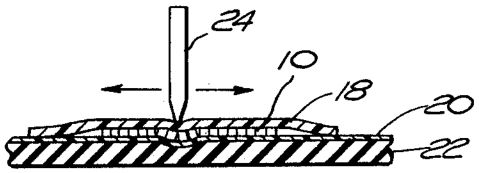
FIG. 3 is a detail view of FIG. 2.

In any event, the tape with the wafer is then applied to a release surface 20, adhesive side down as shown in FIGS. 2 and 3. The release surface 20 is a smooth, clean, flexible material preferably a tape such as fluorinated ethylene propetine film of 2 mil thickness applied to a resilient backing member 22. With the tape 18 and wafer 10 applied over the release surface 20 a tool 24 is rubbed over the back of the non-adhesive surface of the tape and wafer several times in both directions. The tool 24 preferably is formed with an edge having a small radii and this will cause the wafer to fracture along the grid form score lines. As shown in FIG. 3 the tool will cause distortion of the wafer, which is quite brittle, and the individual circuit devices or dies 16 will break away from one another. Several passes of the tool will usually result in complete breakage of the wafer. Following this operation the tape 18 is peeled away from the surface 20 with the individual separated dies 16 remaining intact on the adhesive side of the tape 18.

Figure 4:
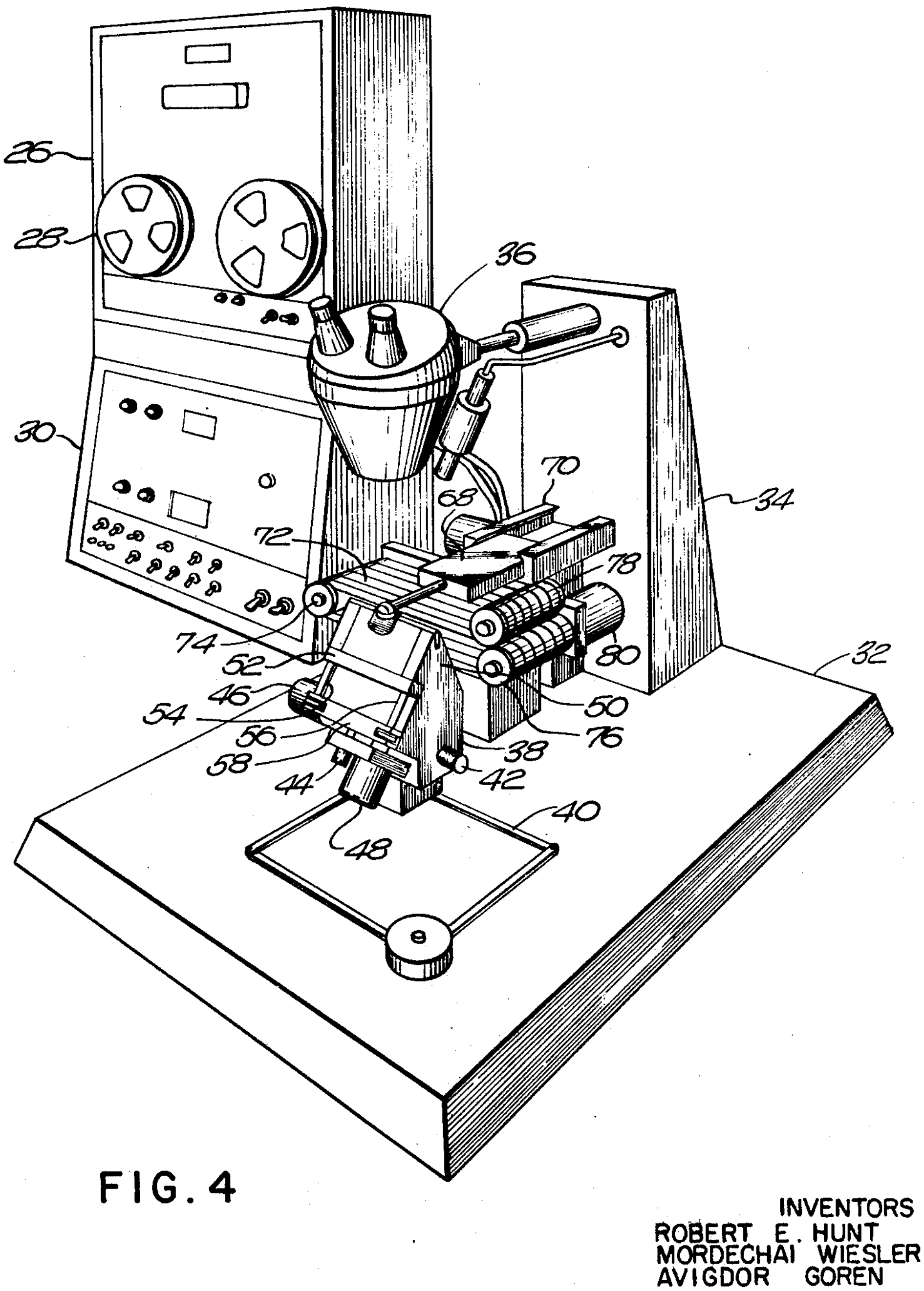
FIG. 4 is a view in perspective of an apparatus made according to the invention for sorting semi-conductor devices.
Figures 5, 6:
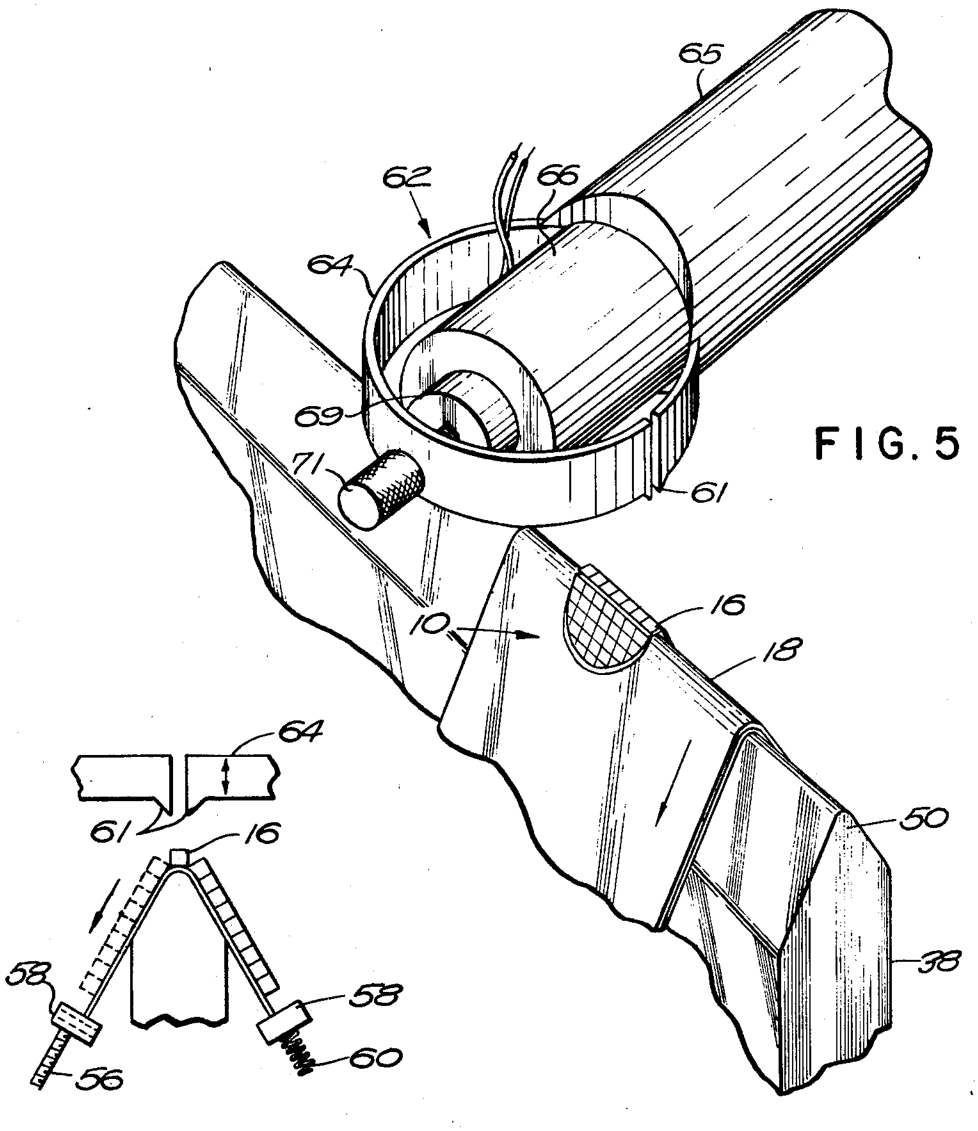
FIG. 5 is a fragmentary view of FIG. 4 on an enlarged scale showing a rest, wafer and pickup device.
FIG. 6 is a detail end elevation of the FIG. 5 device, and, FIG. 7 is a somewhat schematic view in perspective illustrating the technique for packaging individual components.

The tape 18 together with the array of semi-conductor dies 16, after breakage of the wafer, is then transferred to the apparatus shown in FIGS. 4, 5 and 6. This apparatus includes a tape reader control 26 for tapes 28 which carry data with respect to the circuit characteristics of the individual semiconductor devices which made up the wafer. It will be understood that each wafer before it is broken and sorted is first tested by equipment, forming no part of this invention, in which each circuit device is examined to determine its electrical characteristics and the data obtained is recorded on the tape. A tape is provided for each wafer which is being sorted and the tape will provide the necessary instructions for carrying out the sorting operation described more fully below. Associated with the tape reader control 26 is a coordinate control unit 30 which converts the signals from the tape reader control to signals for the various drive units in the sorting machine.

The sorting machine generally is organized about a horizontal base 32 having upright standard 34 to which is mounted a microscope 36 to permit the operator to visually examine the devices during the sorting operation. Mounted on the base 32 is an upright rest 38 operatively connected to a micro-positioning pantograph 40 adapted to position the rest precisely with respect to other portions of the unit. The rest 38 includes X and Y axis micro adjustment screws 42 and 44 respectively along with X and Y axis drive motors 46 and 48 respectively. The rest itself is formed with a nose portion 50 having a horizontal edge of a rather small radii over which the tape 18 with the semi-conductive dies 16 is carried. In practice, the nose portion of the rest is formed at a 60° angle with a radius of .005 inch at the apex over which the tape and semi-conductors pass. The tape is held against the upper surfaces of the rest by means of clamps 52 on the front and rear sides of the rest as viewed in FIG. 4. The front clamp is connected by lead screws 54 and 56 to a slide 58 driven by the Y axis drive motor 48. The screws 54 and 56 are employed to adjust the attitude of the clamp to insure that the rows of dies move in a line parallel with the edge of the rest. A similar clamp is employed on the back face of the rest and is connected by springs 60 (FIG. 6) to a fixed portion of the rest. It will be understood that each time the Y axis drive indexes the tape with the semi-conductive dies will advance one row at a time over the edge of the rest. It also will be understood that the signfal to index the Y axis drive 48 will originate from the tape reader and the coordinate control systems.

As best shown in FIGS. 5 and 6 as the tape 18 together with attached dies 16 moves over the edge of the rest, the row that is brought to the apex of the rest will be elevated from the sides of the leading end trailing rows and in position to be grabbed by jaws 61 of an electro-mechanical tweezer generally indicated by reference character 62. The tweezer will pick off each individual die 16 from the adhesive surface of the tape and transfer it to a predetermined group of other dies of the same grade.

The electro-magnetic tweezer 62 comprises a split ring 64 mounted on the outer end of a rod 65 carried by a slide 68 which in turn is mounted for horizontal movement to a slide frame 70 on the base 32. The split ring 64 is fabricated from a magnetically attractive material such as Armco iron or the like and encircles a coil 66. The coil is formed with a core 69 located opposite a gap adjustment screw 71 on the ring. In practice, a .040 inch air gap is maintained between the core 69 and the ring 62 in open position. It will be understood that each time the coil is energized the outer portion of the ring 64 will be attracted towards the core and this in turn will cause the jaws 61 to move towards one another in a closing action. Operation of the coil is timed so that the jaws close against an individual die 16 which will be in a row extending upright along the edge of the rest as suggested in FIG. 6. The tweezer slide is mounted for vertical indexing movement whereby the tweezers will normally be located above the rest but on signal will drop down with its jaws spanning either side of the die 16 and on signal the tweezers will close against the die. Thereupon the tweezers then raise up with the die and the slide will retract. The retraction of the slide is controlled by data obtained from the tape reader and will stop with the die in the tweezer jaw located over one of a series of carrier belts 72 located between the standard 34 and the rest 38.

The carrier belts extend horizontally between feed spools 74 and take-up spools 76. Overlay tape spools 78 are mounted over the take-up spools 76 and apply an adhesive backing layer to the belts in a packaging arrangement to be described more fully below. The take-up spools 76 are indexed individually by means of a motor 80. It will be understood that each belt is intended to receive semi-conductor dies of a particular electrical characteristic so that all dies received on a particular belt will be of the same grade.

Figure 7:
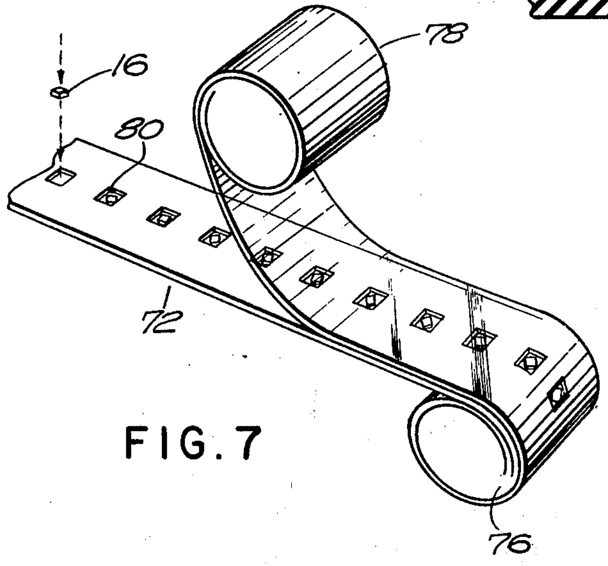

Referring now to FIG. 7 there is shown in more detail a system for automatically packaging the individual dies as they are sorted. The system includes the belt 72 which preferably is of a flexible plastic material pre-formed with shallow pockets 80 dimensioned to accommodate and receive individual semiconductor dies 16 deposited by the electro-magnetic tweezer after its removal from the adhesive strip. Each pocket 80 receives a die 16 with all of the dies being of the same electrical characteristic for a particular belt 72. Each time a die is deposited in a pocket 80 the belt 72 is indexed to the right as viewed in FIG. 7 to be taken up on a spool 76. As the belt indexes the overlay tape is applied from the spool 78. The overlay preferably is a pressure sensitive adhesive tape which is pressed against the upper surface of the belt 72 closing each pocket and sealing the individual semi-conductor dies in place. Thus as the spool 76 winds up it becomes a package of dies of the same characteristic.

Having thus described the invention what we claim and desire to obtain by Letters Patent of the United States is:

1. Apparatus for sorting semi-conductor dies from a group of dies broken from a wafer and arranged in rows and columns on a pressure sensitive adhesive tape, comprising (a) an abutment formed with a straight edge, (b) means for mounting said tape to said abutment and over said edge with said dies facing outwardly, (c) means for advancing said tape over said edge whereby each row of dies will be presented along said edge elevated from adjacent rows, and, (d) die pick-up means movable to and away from said edge and adapted to transfer each die from said tape to one of several positions according to the characteristic of each die.

2. Apparatus according to claim 1 wherein the edge of said abutment is formed with a curve of small radius.

3. Apparatus according to claim 1 including power indexing means for automatically advancing said tape and dies over said edge.

4. Apparatus according to claim 1 wherein said die pick-up means includes a pair of tweezers having jaws adapted to open and close on each of said dies.

5. Apparatus according to claim 4 including tweezer actuating means for opening and closing the tweezer jaws in predetermined timed sequence.

6. Apparatus according to claim 4 including tweezer mounting means for moving said tweezers back and forth between a die engaging position and a number of die releasing positions.

7. Apparatus according to claim 3 including other power indexing means for advancing said abutment together with said tape and dies along a path parallel to said edge.

8. Apparatus according to claim 1 including a movable belt at each of said several positions and adapted to receive dies deposited thereon.

9. Apparatus according to claim 8 including power indexing means for selectively advancing said belts.

10. Apparatus according to claim 9 including a bonding tape disposed along the path of travel of each of said belts and adapted to be applied thereon as said belts advance.

11. The method of sorting semi-conductor dies from a Monolithic wafer, comprising the steps of (a) scoring the surface of said wafer along lines dividing said dies, (b) mounting said wafer to a flexible adhesive tape, (c) applying said tape and said wafer to a resilient surface with said wafer between said tape and surface, (d) applying a moving line of pressure against said tape parallel to said score lines to break said wafer into an array of separated dies, (e) separating said tape with said array of dies from said surface, and, (f) removing individual dies from said tape and placing them in predetermined groups.

References Cited

UNITED STATES PATENTS

| | | | |
|---|---|---|---|
| 3,040,489 | 6/1962 | Da Costa | 53—21 |
| 3,054,709 | 9/1962 | Freestone et al. | 29—583 X |
| 3,149,765 | 9/1964 | Horning et al. | |
| 3,230,625 | 1/1966 | Meyer | 225—2 X |
| 3,384,279 | 5/1968 | Grechus | 225—2 |
| 3,392,440 | 7/1968 | Yanaoawa | 225—2 X |
| 3,426,423 | 2/1969 | Koch et al. | 29—574 |

PAUL M. COHEN, Primary Examiner

U.S. Cl. X.R.

29—423, 559; 53—21; 225—2